United States Patent [19]

Stein et al.

[11] Patent Number: 4,539,646
[45] Date of Patent: Sep. 3, 1985

[54] TONE DETECTION ARRANGEMENT

[75] Inventors: Paul J. Stein, Blindley Heath; Rodney W. Gibson, Burgess Hill, both of England

[73] Assignee: U.S. Philips Corporation, New York, N.Y.

[21] Appl. No.: 355,635

[22] Filed: Mar. 8, 1982

[30] Foreign Application Priority Data

Mar. 18, 1981 [GB] United Kingdom ............... 8108450

[51] Int. Cl.³ ............................................. G06F 15/31
[52] U.S. Cl. .................................... 364/484; 364/728
[58] Field of Search ........................ 364/900, 484, 728; 324/78 D, 78 Q; 377/19; 179/84 VF

[56] References Cited

U.S. PATENT DOCUMENTS

| | | | |
|---|---|---|---|
| 2,992,384 | 7/1961 | Malbrain | 364/484 |
| 3,829,785 | 8/1974 | Schroder et al. | 364/484 |
| 3,930,199 | 12/1975 | Valis | 364/484 |
| 3,990,007 | 11/1976 | Hohhof | 324/78 D |
| 4,211,897 | 7/1980 | Ichikawa et al. | 364/728 |
| 4,279,017 | 7/1981 | Bos et al. | 364/484 |
| 4,326,256 | 4/1982 | Furumoto | 364/484 |
| 4,354,252 | 10/1982 | Lamb et al. | 364/900 |
| 4,363,100 | 12/1982 | Agnew et al. | 364/484 |
| 4,374,358 | 2/1983 | Hirose | 377/19 |

Primary Examiner—Jerry Smith
Assistant Examiner—Michael R. Fleming
Attorney, Agent, or Firm—Thomas A. Briody; William J. Streeter

[57] ABSTRACT

A multi-tone sequential call signal detector in which a microcomputer is used to detect the tones of a received signal by simulating digitally the response of analogue tuned circuits. The detector includes a limiter for producing a square wave signal from a tone signal, a differentiator for producing interrupt pulses, and a microcomputer which responds to the interrupt pulses to activate a visual display and a call lamp of an output circuit when it detects all the received tones of the signal. The microcomputer performs an algorithm by which it measures the period between successive interrupt pulses, determines which tone frequency has this period, starts a number count which represents the "rise" response of a tuned circuit for that tone frequency, and determines when the number count reaches a threshold number which represents the resonant condition of the tuned circuit.

7 Claims, 7 Drawing Figures

TONE DETECTION ARRANGEMENT

BACKGROUND OF THE INVENTION

1. Field of the Invention

This invention relates to a tone detection arrangement of a type in which the tones of an electrical multi-tone signal comprising a plurality of sequential tone bursts can be successively detected: the arrangement provides recognition of the signal, as received by it, only if it is able to detect all of the tones of the signal.

A tone detection arrangement of the above type has application, for example, in the mobile stations of a mobile radio system for detecting multi-tone sequential call signals which are used to address uniquely the mobile stations. Thus, for instance, in a mobile radio system consisting of a fixed control station and a plurality of vehicle-mounted mobile stations, each mobile station is allocated a unique multi-digit number, and a speech or data message to be transmitted to a particular mobile station by the control station is preceded by a multi-tone sequential call signal the tones of which correspond to the digits of the multi-digit number allocated to that mobile station. The tone detection arrangement in each mobile station makes the recognition when the station is called, for instance by lighting a call lamp. This avoids the need for driver-radio operators in the mobile stations having to listen for their individual call signs, perhaps at the expense of attention to driving.

2. Description of the Prior Art

A presently known tone detection arrangement of the above type comprises a tuned circuit with a tapped coil. Respective taps on the coil tune the tuned circuit for resonance at different tone frequencies, a control unit being included in the arrangement for controlling the switching to a required tap. In operation, the arrangement is switched initially to the tap for which the tuned circuit is tuned to the frequency of the first tone of a multi-tone sequential call signal which the tone detection arrangement is to recognise. When in response to a received multi-tone sequential call signal the voltage across the tuned circuit exceeds a threshold voltage, signifying detection of the first tone, the control unit switches to the tap for which the tuned circuit is tuned to the frequency of the second tone of the multi-tone sequential call signal. If the voltage across the tuned circuit now exceeds the threshold voltage again, signifying detection of the second tone, switching to the next tap is effected, and so on. If all the tones of the multi-tone sequential call signal are detected, the tone detection arrangement provides recognition of the signal. Timing circuits in the arrangement ensure separation between the detection of the successive tones of the received multi-tone sequential call signal.

In an alternative form of such presently known tone detection arrangement, the tuned circuit is tuned for resonance at different tone frequencies by the control unit switching to different capacitors instead of to different coil taps.

The cost of such an analogue tone detection arrangement can be high, due to the number of discrete components required for its implementation and hence the number of soldered interconnections needed. This latter requirement may, in turn, contribute to unreliability. Furthermore, such an analogue tone detection arrangement can suffer from ageing, which requires it to be re-tuned periodically.

SUMMARY OF THE INVENTION

The present invention proposes a digital implementation of a tone detection arrangement of the type referred to, which seeks to avoid or at least mitigate the above disadvantages which are present for an analogue implementation. The use of a microprocessor or, preferably, a single component microcomputer is envisaged for such a digital implementation, with a minimum of other circuitry. This affords the advantage of reducing the number of interconnections required, thereby increasing reliability and decreasing construction cost, compared with the analogue implementation. Also, such a digital implementation of tone detection arrangement can be readily programmed to recognise different multi-tone sequential call signals selectively, rather than being "tailor-made" to recognise only one particular multi-tone sequential call signal, which is the case for the analogue implementation. Furthermore, the microprocessor or microcomputer used for the digital implementation can additionally be used for an entirely different purpose if it has sufficient working capacity. For instance, in a receiver of a mobile radio station which includes a printer, a microcomputer which is used in a digital implementation of a tone detection arrangement might additionally be used to demodulate a received digital data signal and to control the "hand-shaking" operations to the printer for the print-out of the digital data.

According to the invention a tone detection arrangement of the type referred to is characterised by means responsive to a multi-tone signal to produce a pulse (hereinafter termed an "interrupt pulse") in respect to each zero crossing in at least one sense of the multi-tone signal, together with digitally operable logic means responsive to said interrupt pulses to perform the following functions:

(1) measure the period between successive interrupt pulses;

(2) determine which tone frequency has this period;

(3) increase a number count in one of a set of stores which pertain respectively to a plurality of simulated tuned circuits, the number count representing the "rise" response of the simulated tuned circuit concerned;

(4) determine when a number count reaches a threshold number which represents the resonant condition of one of the simulated tuned circuits;

(5) reduce all the number counts by a fraction of their value to represent the "fall" response of the simulated tuned circuits.

To perform these functions (1) to (5) and to use their result to achieve multi-tone signal recognition, the digitally operable logic means is preferably programmed to carry out the following algorithm under the timing control of a clock pulse generator:

(a) count the number of clock pulses occurring in the period between each interrupt pulse and the preceding interrupt pulse, to produce a first number which is representative of this measured period:

(b) compare said first number with pre-determined numbers which are respectively representative of the periods of all the different possible tone frequencies which the multi-tone signal can have, to obtain a notional or tentative detection of the particular tone frequency to which said measured period corresponds;

(c) generate in respect of each notional detection of a tone frequency a number count commencing with a selected number, and thereafter increment the relevant number count by a given number each time the notional detection of the tone frequency concerned is obtained;

(d) after incrementing a number count, compare it with a threshold number to obtain a confirmed detection of the tone frequency concerned when the number count exceeds said threshold number;

(e) decrement by some fraction of their respective values the number counts subsisting in respect of all the tone frequencies, after each comparison of any number count with said threshold number in which the threshold number is not exceeded;

(f) provide a recognition of the multi-tone signal when a confirmed detection of all of the tone frequencies thereof in succession has been obtained.

Visual and/or audible display of the recognition provided by function (f) can be effected by suitable means responsive to output signals which are produced by said digitally operable logic means consequent upon this recognition.

The effect of the algorithm steps (a) to (e) set forth above is to simulate digitally the transient response of a set of tuned circuits to a received tone frequency. In this simulation, steps (a) and (b) detect which tone frequency is being received, step (c) simulates the rise of voltage across the particular tuned circuit which would be tuned for resonance at that tone frequency, step (d) simulates the resonant condition of that tuned circuit, and step (e) simulates the fall of voltage across that tuned circuit. Step (e) additionally simulates the fall of voltage across what would be the tuned circuits for all the other tone frequencies, on the premise that steps (a) and (b) will (erroneously) detect notionally, but not consistently, one or more other tone frequencies due to, say, noise, before the simulated resonant condition in respect of the correct tone frequency is reached. Without this additional simulation by step (e), there could be a gradual build-up of a number count to an erroneous simulated resonant condition in respect of such one or more other tone frequencies.

In carrying out the invention, the selected number and the given number specified in step (c) for initiating and incrementing a number count respectively, are preferably chosen to have the same value.

This same value number is preferably so related to the threshold number used on step (d) and to the fraction used in step (e), that the rise and fall of said number count tends to be exponential.

The various numbers required for the performance of the algorithm set forth above can readily be determined empirically for a given range of tone frequencies and a given clock pulse frequency, an example being given later in this specification.

In order that the invention may be more fully understood, reference will now be made by way of example to the accompanying drawing.

Figure 1:
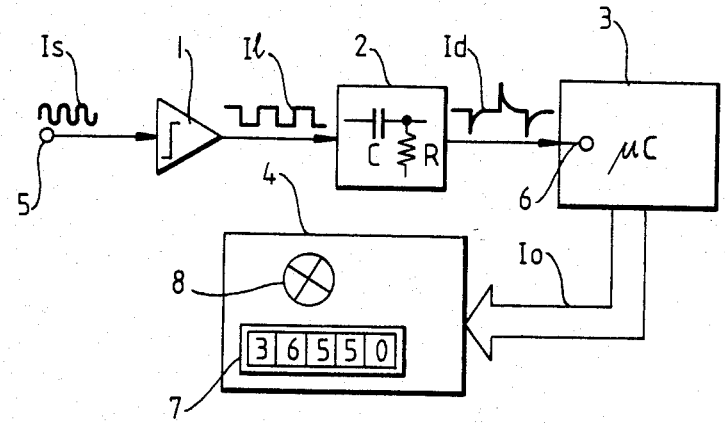
FIG. 1 shows a block diagram of a tone detection arrangement according to the invention.

The specific embodiment of tone detection arrangement according to the invention to be hereinafter described with reference to the drawing is for detecting five-tone sequential call signals. Five-tone sequential call signalling is a means for uniquely addressing up to 100,000 different users on, say, a single radio channel of a mobile radio system. For instance, in the EEA (Electronic Engineering Association) System, five-tone sequential call signalling consists of five successive 40 ms. tone bursts, each tone being at one of twelve different frequencies representing, respectively, the digits 0-9, a group call G, and a repeat tone R which provides that no two successive tones are at the same frequency. The actual 12 different frequencies used for the EEA System five-tone sequential call signalling are given in the following TABLE I.

TABLE I

| Digit | Frequency No. | Frequency (Hz) |
|---|---|---|
| G | F1 | 1055 |
| 1 | F2 | 1124 |
| 2 | F3 | 1197 |
| 3 | F4 | 1275 |
| 4 | F5 | 1358 |
| 5 | F6 | 1446 → FA = 1500 |
| 6 | F7 | 1540 |
| 7 | F8 | 1640 |
| 8 | F9 | 1747 |
| 9 | F10 | 1860 |
| 0 | F11 | 1981 |
| R | F12 | 2110 |

Figure 4:
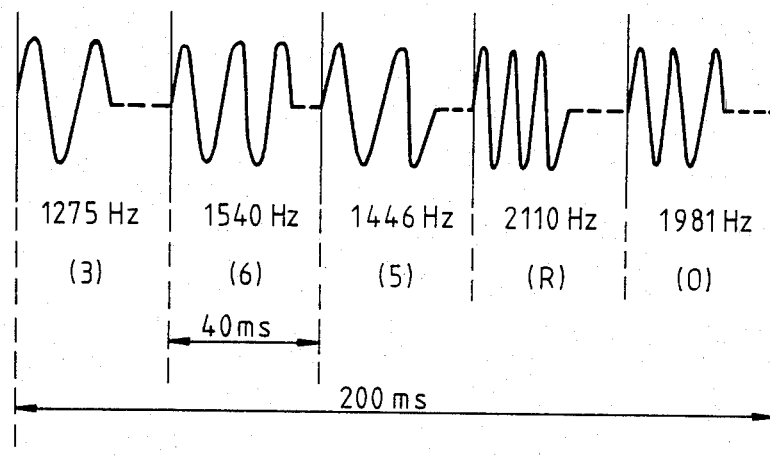
FIGS. 4, 5, 6 and 7 show explanatory waveform diagrams.

Thus, for example, as illustrated in FIG. 4, the five-tone sequential call signal 36550 would consist of sequential 40 ms. bursts of the tone frequencies 1275 Hz, 1540 Hz, 1446 Hz, 2110 Hz and 1981 Hz, the entire signal thus occupying 5×40=200 ms. The specification for the EEA System requires that the tone frequencies transmitted be within 2% of the specified frequencies.

Referring now to the drawings, the tone detection arrangement shown in FIG. 1 comprises a limiter 1, a differentiator 2, a microcomputer 3 and an output circuit 4. The limiter 1 may include a high gain amplifier which is operable to "square-off" the sinusoidal waveform of an input signal Is, applied to an input terminal 5 of the arrangement, to produce a square-wave limited signal Il. The differentiator 2 may comprise a simple RC-network, as indicated, in the case where the microcomputer 3 is adapted to receive an interrupt pulse in response to each zero crossing of the limited signal Il in one sense only, for instance on negative-going excursions only. The differentiator 2 produces a differentiated signal Id which is applied to an interrupt terminal 6 of the microcomputer 3, the latter being responsive to each negative-going (interrupt) pulse of the signal Id to start a tone detection routine (to be described). When the microcomputer 3 has detected a five-tone sequential call signal, it applies output signals Io to the output circuit 4. The microcomputer 3 can have an output routine such that when any 5-digit number is detected, it supplies output signals Io appropriate for causing the number to be displayed on a visual display 7 (e.g. an L.E.D. display) in the output circuit 4. Additionally, the microcomputer output routine can be arranged to cause a further output signal Io to be produced, to energise a call lamp 8 in the output circuit 4, when the detected 5-digit number uniquely identifies, say, a mobile radio station in which the tone detection arrangement is provided.

Figure 5:
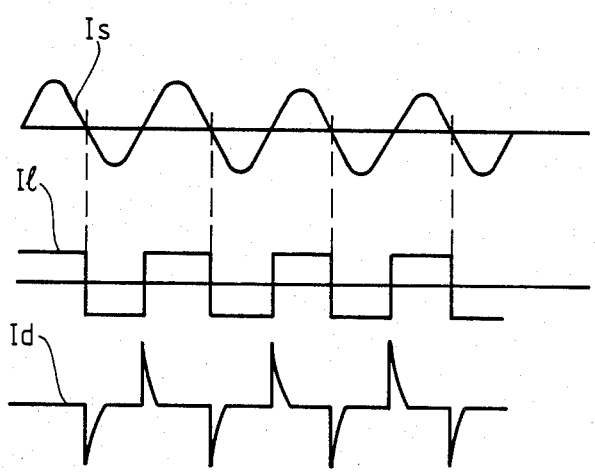

Idealized waveforms for the signals Is, Il and Id are shown in FIG. 5. As a possible modification to the arrangement of FIG. 1, the differentiator 2 may include logic circuitry for inverting the positive-going pulse of the signal Id, so that this pulse serves as an interrupt pulse as well as the negative-going pulse.

Figure 2:
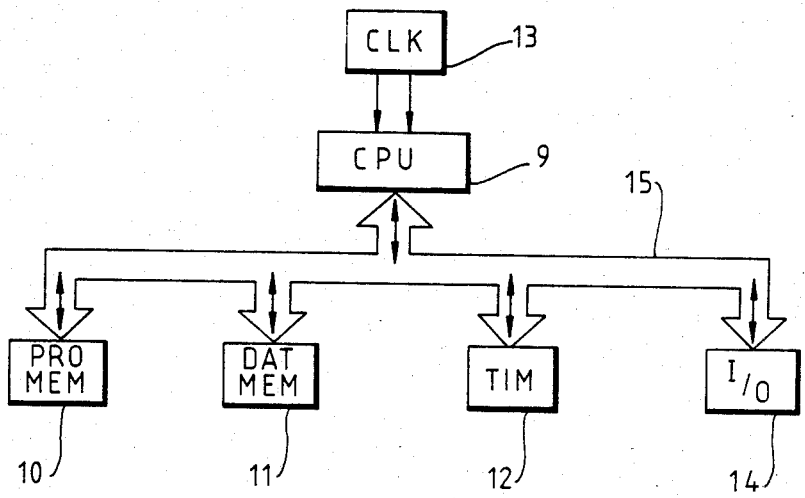
FIG. 2 shows a block diagram of a microcomputer which is suitable as the microcomputer in the arrangement of FIG. 1.

A single component 8-bit microcomputer which is suitable as the microcomputer 3 in the arrangement shown in FIG. 1, is the 8048 microcomputer marketed by Intel. A block diagram of this 8048 microcomputer is shown in FIG. 2, the main features thereof being an 8-bit central processor unit (CPU) 9, a program memory (PRO MEM) 10 having a capacity of 1024 8-bit words, a data memory (DAT MEM) 11 having a capacity of 64 8-bit words, an 8-bit interval timer/event counter (TIM) 12, an oscillator and clock circuits (CLK) 13, and input/output circuits (I/O) 14. All the elements 9, 10, 11, 12 and 14 are interconnected by means of a two-way bus 15. The central processor unit 9 comprises arithmetic logic circuits, an accumulator, an instruction register and decoder, and various flags. It can accept instructions from the programme memory 10 to manipulate its accumulator, the data memory 11, the interval timer/event counter 12 and the input/output circuit 14. Under the control of the arithmetic logic circuits the accumulator can perform inter alia the following functions; viz: add/subtract (with or without carry); "AND"; "OR"; "EXCLUSIVE-OR"; increment/decrement; and bit complement. Eight data registers are available in the data memory 11 and the central processor unit 9 can give instructions to increment or decrement any of these registers. Other instructions afforded by the central processor unit 9 are concerned with conditional and unconditional branching, subroutines, flag control, data moves, input/output control, timer/counter control and interrupt control. A full instruction set is available with the microcomputer. These instructions can readily be utilised by a person skilled in the art to programme the microcomputer to perform the functions given in the flow chart of FIG. 3 for carrying the invention into effect.

Figure 3:
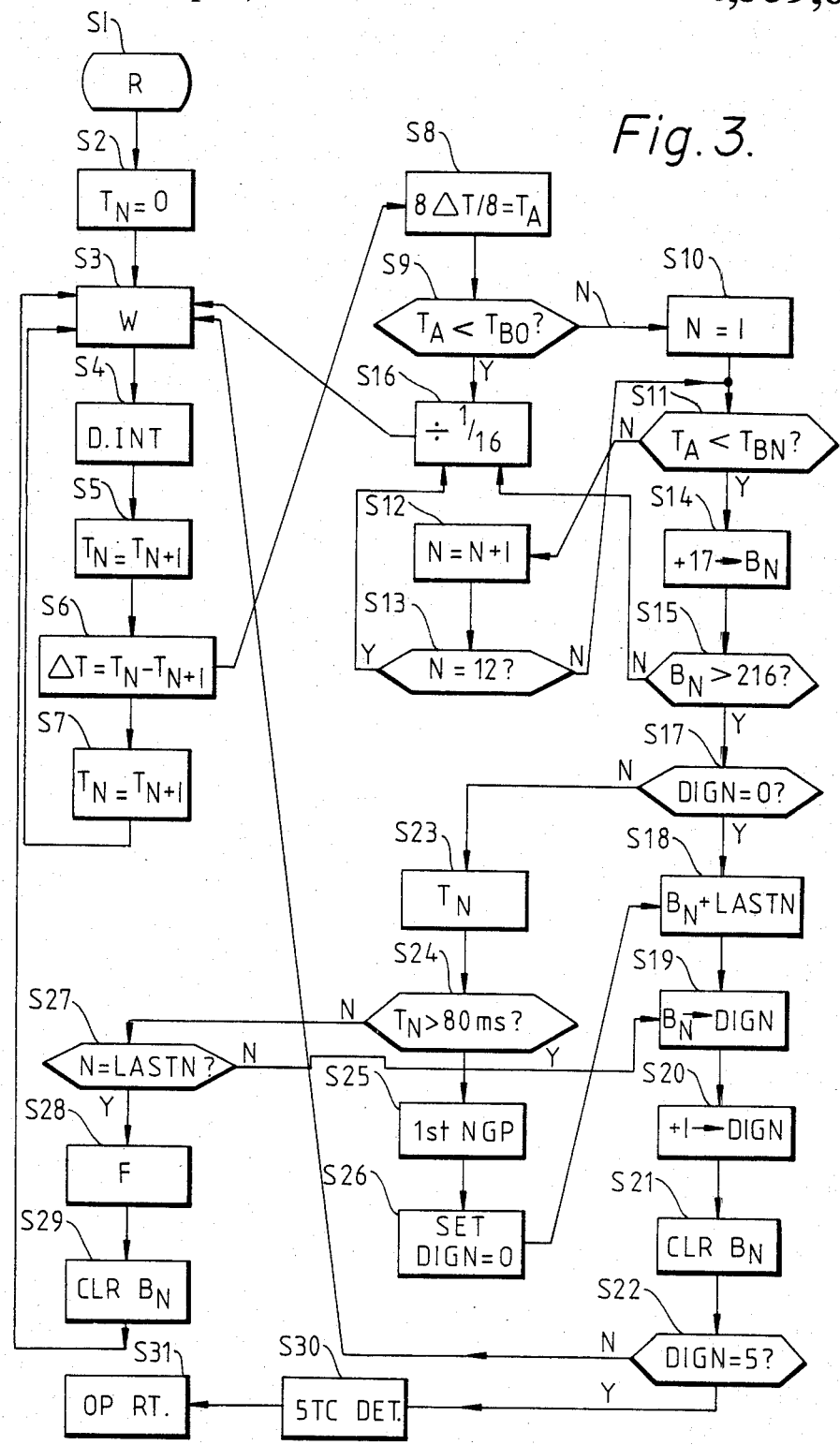
FIG. 3 shows a flow chart in accordance with which the microcomputer in the arrangement of FIG. 1 would be programmed.

Before considering, as set forth in the flow chart of FIG. 3, the operation of the microcomputer 3 in the arrangement of FIG. 1, certain aspects governing the preparation of the algorithm which the flow chart represents will be dealt with. As mentioned previously in the specification, certain functions performed by the microcomputer are intended to simulate the response of a tuned circuit to a tone frequency which is the resonant frequency of the tuned circuit. In this simulation, it is advantageous to consider only an approximated response of the tuned circuit to its resonant frequency.

Figure 6:
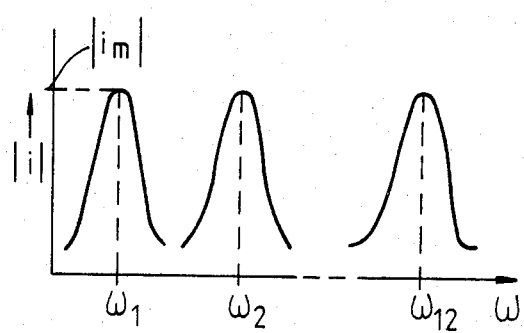
Figure 7:
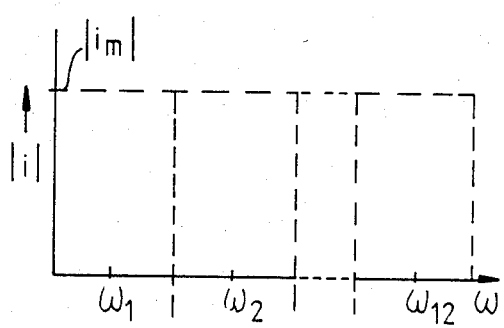

More specifically, assuming that the frequency response of twelve tuned circuits whose resonant frequencies are, respectively, the 12 tone frequencies F1 to F12 in TABLE I, then the frequency response of these twelve tuned circuits can be as represented in FIG. 6 which shows the frequency response on a graph of absolute current magnitude $|i|$ against angular frequency $\omega$, where $\omega_1 = 2\pi F1$, $\omega_2 = 2\pi F2$, ... $\omega_{12} = 2\pi F12$. For each tuned circuit the current flow through it is at a maximum value $|i_m|$ at the resonant frequency ($\omega$.) of the tuned circuit, and falls sharply over a narrow frequency band at either side of the resonance frequency. In order to simulate these frequency responses accurately in the microcomputer, a large amount of processing time and storage would be required, which is undesirable. The approximated response of the tuned circuits which is actually used is represented in FIG. 7, from which it can be seen that the response of each tuned circuit is assumed to be the maximum value $|i_m|$ over the entire narrow frequency band concerned. This approximation involves much less storage and much less processing because only the band pass limits need to be identified.

Another approximation which further simplifies processing has been to assume that the transient response of each tuned circuit is the same, irrespective of its actual resonant frequency. The transient response which was chosen for the embodiment being described was for a resonant frequency approximately in the centre of the frequency range covered by the twelve frequencies, i.e., a frequency FA of 1500 Hz (see TABLE I).

The functions which simulate the response of a tuned circuit can be summarised as follows.

(1) Measure the period between successive interrupt pulses.
(2) Determine which tone frequency has this period.
(3) Start a number count which represents the "rise" response of a tuned circuit for that tone frequency.
(4) Determine when the number count reaches a threshold number which represents the resonant condition of the tuned circuit.

In the algorithm represented by the flow chart of FIG. 3, the function (1) is carried out by counting the number of clock pulses which occur in a period between successive interrupt pulses. Since, for any tone frequency, this period (and thus the clock pulse count) may vary from cycle to cycle due to the presence of noise, the average clock pulse count taken over the last n periods is taken to determine the period. Suitably, n=8.

The function (2) is carried out by comparing the average clock pulse count which defines a period with a series of stored "tone" numbers which correspond, respectively, to the tone frequencies. Because of the approximation which has been made in accordance with FIG. 7, any two adjacent "tone" numbers define between themselves a narrow band of numbers and, ideally, the average clock pulse count in respect of a tone frequency corresponds to the centre number in the relevant narrow band of numbers. In this way, each tone frequency is given, in effect, a band pass limit and is detected whenever the average clock pulse count for that tone frequency falls within the narrow band of numbers concerned.

The function (3) is carried out by allotting a store to a detected tone frequency and adding a fixed number to that store each time the tone frequency is detected.

The function (4) is carried out simply by comparing the number in the store with the threshold number. This function signifies the confirmed detection of a tone frequency.

The function (5) is carried in respect of all the stores which have been allotted to tone frequencies. This function ensures that a store in respect of a bona fide tone frequency detection will have its contents increase progressively towards the threshold number, despite the fractional reductions, whereas the contents of a store which has been allotted to a "spuriously" detected tone frequency will have its contents progressively decrease by the fractional reductions because function (3) will occur only infrequently for the "spuriously" detected tone frequency. Without this progressive decrease, the contents of a store allotted to a "spuriously" detected tone frequency would eventually reach the threshold number to cause the confirmed detection of this tone frequency.

The following TABLE II lists the periods for the twelve tone frequencies F1 to F12, the corresponding clock pulse counts for each period, the stored "tone" numbers in "tone" stores $T_{B0}$ to $T_{B12}$ and the temporary stores $B_1$ to $B_{12}$ for the tone frequencies F1 to F12.

The figures given in TABLE II are in respect of a clock rate of 7.5025 μs, an increment number of +17 for the function (3), a threshold number of 216 for the function (4) and a fixed fractional reduction of 1/16 for the function (5).

TABLE II

| Digit | Frequency No. | Frequency (Hz) | Temporary Stores | Period (μs) | Clock Pulses ($T_A$) | "Tone" No. | "Tone" Stores |
|---|---|---|---|---|---|---|---|
| | | | | | | 130 | $T_{B12}$ |
| G | F1 | 1055 | $B_{12}$ | 947.9 | 126 → | | |
| | | | | | | 123 | $T_{B11}$ |
| 1 | F2 | 1124 | $B_{11}$ | 889.7 | 119 → | | |
| | | | | | | 115 | $T_{B10}$ |
| 2 | F3 | 1197 | $B_{10}$ | 835.4 | 111 → | | |
| | | | | | | 108 | $T_{B9}$ |
| 3 | F4 | 1275 | $B_9$ | 784.3 | 105 → | | |
| | | | | | | 102 | $T_{B8}$ |
| 4 | F5 | 1358 | $B_8$ | 736.4 | 98 → | | |
| | | | | | | 95 | $T_{B7}$ |
| 5 | F6 | 1446 | $B_7$ | 691.6 | 92 → | | |
| | | | | | | 90 | $T_{B6}$ |
| 6 | F7 | 1540 | $B_6$ | 694.4 | 87 → | | |
| | | | | | | 84 | $T_{B5}$ |
| 7 | F8 | 1640 | $B_5$ | 609.8 | 81 → | | |
| | | | | | | 79 | $T_{B4}$ |
| 8 | F9 | 1747 | $B_4$ | 572.4 | 76 → | | |
| | | | | | | 74 | $T_{B3}$ |
| 9 | F10 | 1860 | $B_3$ | 537.6 | 72 → | | |
| | | | | | | 70 | $T_{B2}$ |
| 10 | F11 | 1981 | $B_2$ | 504.8 | 67 → | | |
| | | | | | | 65 | $T_{B1}$ |
| R | F12 | 2110 | $B_1$ | 473.9 | 63 → | | |
| | | | | | | 61 | $T_{B0}$ |

Turning now to the flow chart shown in FIG. 3, in accordance with which the microcomputer 3 in FIG. 1 would be programmed to perform the invention. The various instruction and decision boxes in this flow chart have the following significance.

S1-R: Reset the microcomputer in readiness for 5-tone sequential call detection.

S2-$T_N$=0: Set a period timer to zero.

S3-W: Wait for an interrupt pulse.

S4-D.INT: Detect the occurrence of an interrupt pulse.

S5-$T_N$=$T_{N+1}$: Record current time at which interrupt pulse was detected.

S6-$\Delta T$=$T_{N+1}$−$T_N$: Determine and record time $\Delta T$ which has elapsed between W and D.INT. (Steps S3 and S4)

S7-$T_N$=$T_{N+1}$: Set $T_N$ to current time $T_{N+1}$ and return to W. (Step S3).

S8-8$\Delta T$/8=$T_A$: Determine the average period $T_A$ of the last eight periods $\Delta T$.

(The above eight programme steps S1 to S8 measure the period between successive interrupt pulses—i.e., they perform the function (1)).

S9-$T_A$<$T_{B0}$?: Is the average period $T_A$ less than the minimum F12 "tone" number (61) in the "tone" store $T_{B0}$?

S10-N=1: If $T_A$≧$T_{B0}$, then set an index register N to 1, where N=1, 2, ... 12. Thus, $T_{BN}$ becomes $T_{B1}$.

S11-$T_A$<$T_{BN}$?: Is the average period $T_A$ less than the maximum F12 "tone" number (65) in "tone" store $T_{B1}$?

S12-N=N+1: If $T_A$≧$T_{B1}$, then $T_{BN}$ is changed from $T_{B1}$ to $T_{B2}$.

S13-N=12: Steps S11 and S12 are thereafter repeated, as necessary, until the average period $T_A$ is less than a particular one of the maximum "tone" numbers in the stores $T_{B2}$ to $T_{B12}$. This routine is exited when $T_A$ has been compared to all "tone" numbers.

(The above five programme steps S9 to S13 determine which tone frequency has the period measured in steps S1 to S8—i.e. they perform the function (2)).

S14-+17→$B_N$: When $T_A$<$T_{BN}$ in step S11, the increment number 17 is added to the particular temporary store $B_N$ (N=1,2 ... 12) which is associated uniquely with the relevant tone frequency.

(This programme step S14 performs the function 3)

S15-$B_N$>216?: The particular temporary store $B_N$ to which the increment number 17 has just been added in checked to determine whether the total number count stored therein is more than the threshold number 216.

(This programme step S15 performs the function (4)).

S16-÷1/16: When $T_A$<$T_{B0}$ in step S9, or N=12 in step S13, or $B_N$≦216 in step S15, the number count in all the stores $B_N$ is reduced by 1/16 and step S3(W) is returned to, to await the next interrupt.

(This programme step S16 performs the function (5)).

S17-DIGN=0?: When $B_N$>216 in step S15 a decision is made on whether or not step (15) is in respect of the first received digit of a 5-tone sequential call signal.

S18-$B_N$→LASTN: If step S17 decides that the first received digit is being considered, then the temporary store number $B_N$ for the tone frequency which represents this first received digit is recorded in a register termed LASTN, and a "Record Sub-Routine" comprising the following steps S19 to S22 is initiated.

S19-$B_N$→DIGN: This step records the temporary store number $B_N$ in respect of the first received digit in the first position of a 5-digit store DIGN.

S20-+1→DIGN: This step increments the digit store DIGN one position in readiness to record the temporary store number in respect of the next received digit.

S21-CLR $B_N$: This step clears the >216 number count from the temporary store $B_N$ in respect of the first received digit.

S22-DIGN=5?: This step decides whether or not the digit store DIGN has been incremented to position 5, that is, it has the five temporary store numbers $B_N$ in respect of the five received digits stored in it. Since at present only the first received digit is being considered, step S3(W) is returned to, to await the next interrupt.

S23-$T_N$: If step S17 decides that a received digit is not the first, then this current step provides the total count of the period timer since it was set at step S2.

S24-$T_N$>80 ms?: This step determines whether or not 80 ms. has elapsed since the last interrupt pulse was received.

S25-1ST NGP: If $T_N$>80 ms in step S24, then this current step assumes that the first digit of a new 5-digit group is being received, the previously received digit being due to, say, noise or speech.

S26-SET DIGN=0: This step sets the digit store DIGN to zero in readiness to receive a new first digit and step S18 is returned to.

S27-N=LASTN?: If $T_N \leq 80$ ms in step S24, then this current step determines whether or not the temporary store number $B_N$ in respect of the received digit being dealt with is the same as the previous number $B_N$ recorded in the register LASTN. If this current step S27 decides that the last two successive temporary store numbers $B_N$ are not the same, then step S19 is entered to commence the "Record Routine".

S28-F: If step S27 decides that two successive temporary store numbers $B_N$ are the same, then this signifies a false detection, being probably a second detection of the same digit.

S29-CLR BN: This step clears the >216 number count from the temporary store $B_N$ in respect of the falsely received digit, and step S3 is returned to, to await the next interrupt.

S30-5TC DET: When DIGN=5 in step S22, this current step signifies that a 5-tone sequential call signal has been detected.

S31-OP RT: This step is an "Output Sub-Routine" for providing from the microcomputer the appropriate output signals to the output circuit of the tone detection arrangement for energising the various visual displays.

We claim:

1. A method for detecting the tones of an electrical multi-tone signal comprising a plurality of sequential tone bursts of predetermined frequencies comprising the steps of:
   (a) generating clock pulses;
   (b) producing an interrupt pulse in respect of each zero crossing in at least one sense of the multi-tone signal;
   (c) counting the number of clock pulses occurring in the period between each interrupt pulse and the preceding interrupt pulse to produce a first number which is representative of this measured period;
   (d) comparing said first number with predetermined numbers which are respectively representative of the periods of all the different possible tone frequencies which the multi-tone signal can have, to obtain a tentative detection of the particular tone frequency to which said measured period corresponds;
   (e) generating in respect of each tentative detection of a tone frequency a number count commencing with a selected number, and thereafter incrementing the relevant number count by a given number each time the tentative detection of the tone frequency concerned is obtained;
   (f) after incrementing a number count, comparing it with a threshold number to obtain a confirmed detection of the tone frequency concerned when the number count exceeds said threshold number;
   (g) decrementing by a fixed fraction the values of the number counts subsisting in respect of all of the tone frequencies, after each comparison of any number count with said threshold number in which the threshold number is not exceeded;
   (h) providing a recognition of the multi-tone signal when a confirmed detection of all of the tone frequencies thereof in succession has been obtained.

2. The method as claimed in claim 1 wherein the selected number and the given number for initiating and incrementing a number count, respectively, are chosen to have the same value.

3. The method as claimed in claim 2 wherein the response of each simulated tuned circuit is assumed to have a maximum value over an entire frequency band centered about the resonant frequency of the tuned circuit.

4. The method as claimed in claim 3 wherein the transient response of each simulated tuned circuit is assumed to be the same irrespective of its actual resonant frequency.

5. The method as claimed in claim 1 wherein the chosen same value number is so related to said threshold number and to said fixed fraction that the rise and fall of said number count tends to be exponential.

6. A tone detection arrangement in which the tones of an electrical multi-tone signal comprising a plurality of sequential tone bursts of predetermined frequencies can be successively detected, said arrangement comprising
   means responsive to a multi-tone signal to produce an interrupt pulse in respect of each zero crossing in at least one sense of the multi-tone signal,
   means responsive to said interrupt pulses for measuring the period between successive interrupt pulses;
   means for determining which predetermined frequency has this period;
   means for increasing a number count in one of a set of stores which pertain respectively to a plurality of simulated tuned circuits associated with said predetermined frequencies, the number count representing the "rise" response of the simulated tuned circuit concerned;
   means for comparing each so increased number count to a predetermined threshold number representing the resonant condition of the corresponding simulated tuned circuit to determine if the so-increased number count is less or greater than said predetermined threshold number;

means for reducing all of said number counts in said set of stores by a fraction of their value to represent the "fall" response of the simulated tuned circuit when a so-compared number count is less than said predetermined threshold number; and means for producing an output signal signifying detection of the tone burst having the frequency concerned when a so-compared number is greater than said predetermined threshold number.

7. An arrangement as claimed in claim 6 further comprising visual and/or audible display means responsive to output signals which are produced when detection of all of the tone frequencies of the multi-tone signal has been obtained.

* * * * *